US012738149B2

(12) United States Patent
Betka et al.

(10) Patent No.: US 12,738,149 B2
(45) Date of Patent: Sep. 15, 2026

(54) METHOD AND DEVICES FOR ALERTING ABOUT HUMAN INTERACTION LIMITATION

(71) Applicant: MOTOROLA SOLUTIONS, INC., Chicago, IL (US)

(72) Inventors: Robert Betka, Cracow (PL); Oliwia Strzelec, Warsaw (PL); Jakub Kieszcz, Cracow (PL); Aleksandra K Wojakiewicz, Wieliczka (PL); Grzegorz Szurek, Cracow (PL); Katarzyna B Rugiello, Krosno (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 324 days.

(21) Appl. No.: 18/435,078

(22) Filed: Feb. 7, 2024

(65) Prior Publication Data

US 2025/0252842 A1 Aug. 7, 2025

(51) Int. Cl.

| | |
|---|---|
| ***G08B 25/01*** | (2006.01) |
| ***G08B 25/14*** | (2006.01) |
| ***H04W 4/029*** | (2018.01) |

(52) U.S. Cl.

CPC ........... *G08B 25/016* (2013.01); *G08B 25/14* (2013.01); *H04W 4/029* (2018.02)

(58) Field of Classification Search

CPC ..... G08B 25/016; G08B 25/14; H04W 4/029; G06Q 10/10; G06Q 50/22; G06Q 50/265; G10L 15/00

See application file for complete search history.

(56) References Cited

U.S. PATENT DOCUMENTS

| | | | |
|---|---|---|---|
| 10,004,431 B2 | 6/2018 | Shuster et al. | |
| 10,038,783 B2 | 7/2018 | Wilcox et al. | |
| 10,306,059 B1 * | 5/2019 | Bondareva | ............ H04L 51/214 |
| 10,496,887 B2 | 12/2019 | Ernesti et al. | |

(Continued)

OTHER PUBLICATIONS

Betka, Robert, et al.: “System and Method for Identifying Human Interaction Limitations Based on Historical Information”,U.S. Appl. No. 17/815,239, filed Jul. 27, 2022, all pages.

*Primary Examiner* — Fred A Casca

(74) *Attorney, Agent, or Firm* — Daniel R Bestor

(57) ABSTRACT

The computer-implemented methods and the computing devices for alerting about a citizen interaction limitation are disclosed. An ambient audio signal acquired by a citizen communication device associated with a citizen is monitored to detect an interaction of the citizen with a public safety agency. Responsive to detecting the interaction of the citizen with the public safety agency, an alert is transmitted to a device associated with the public safety agency, the alert comprising data related to the citizen interaction limitation. Additionally or alternatively the alert regarding the interaction of the citizen with the public safety agency comprising data related to a citizen's interaction limitation is received. Location of the citizen is determined and an in-field first responder associated with the location of the citizen is identified. A notification is provided to a communication device associated with the identified in-field first responder, the notification comprising the data related to the citizen interaction limitation or instructions associated with the citizen interaction limitation.

16 Claims, 4 Drawing Sheets

(56) References Cited

U.S. PATENT DOCUMENTS

| | | | |
|---|---|---|---|
| 10,687,751 | B2 | 6/2020 | Wall |
| 11,228,736 | B2 | 1/2022 | Stawiszynski et al. |
| 2016/0261425 | A1* | 9/2016 | Horton .................. H04L 67/535 |
| 2020/0274962 | A1* | 8/2020 | Martin .................... H04W 4/14 |
| 2022/0253445 | A1 | 8/2022 | Jackson et al. |
| 2023/0137857 | A1 | 5/2023 | Choi et al. |

* cited by examiner

METHOD AND DEVICES FOR ALERTING ABOUT HUMAN INTERACTION LIMITATION

BACKGROUND OF THE INVENTION

First responders, such as police officers, generally attempt to communicate with persons of interest by issuing verbal commands and the like (e.g. "Stop", "We need to speak with you", etc.). However, in such situations, some persons of interest may not follow the commands due to one or more human interaction limitations (for example, hearing disability, autism, hypoglycemia or mental illness). If the first responder is not aware of the cause of non-compliance, this could lead to an escalation, potentially including the use of physical force, or a waste of technical resources when the first responder calls in backup to assist with the person of interest.

A similar situation may occur if the person of interest does not follow commands generated by public safety agency equipment like, for example, a camera that automatically detects abnormal behavior and plays a warning through an associated speaker.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
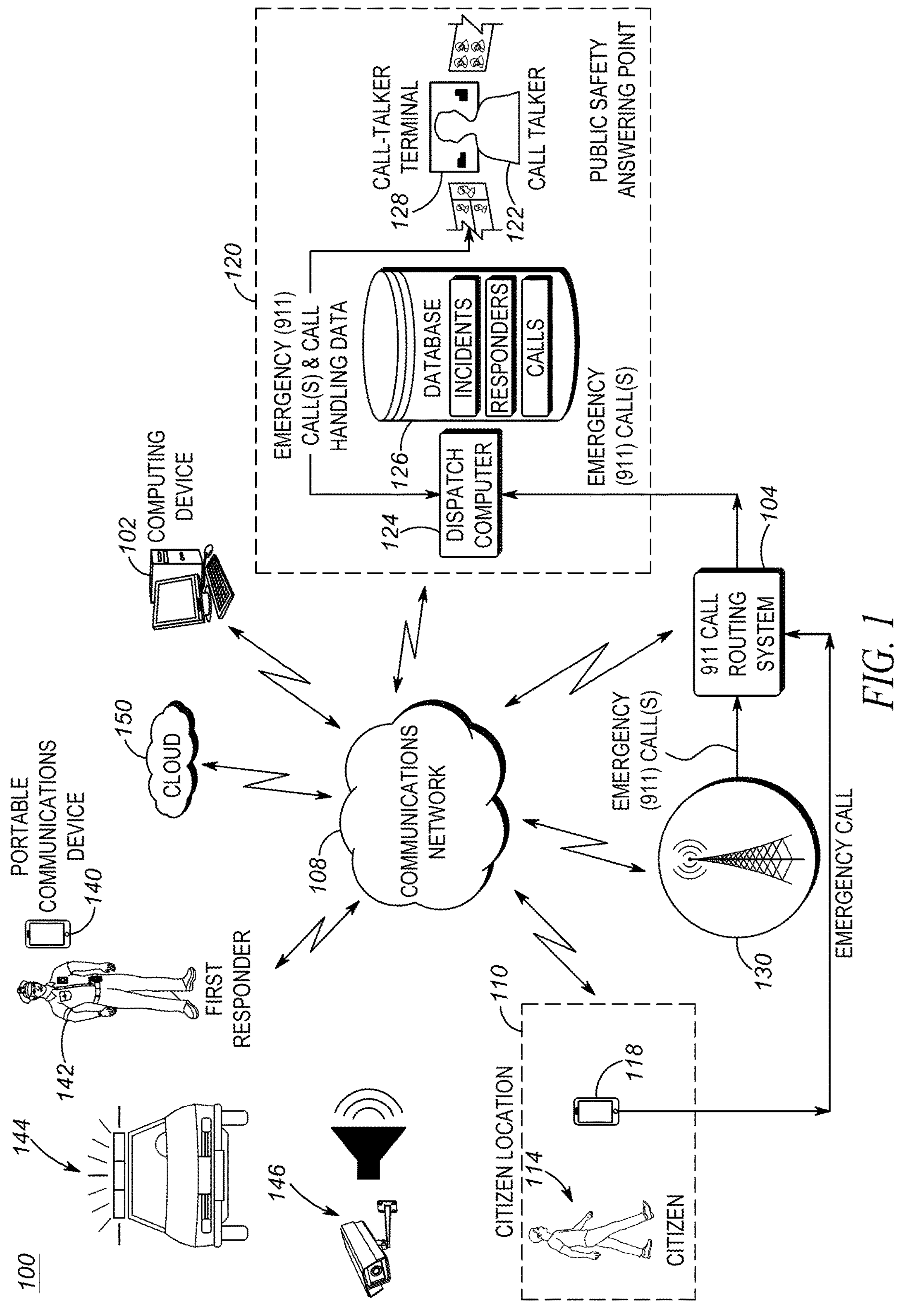
FIG. 1 is a system diagram illustrating a public-safety communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

To address the above-mentioned problem, processes and computing devices for alerting about a citizen interaction limitation are provided herein.

A first aspect of the present invention provides a device for alerting about a citizen interaction limitation comprising a controller and a memory coupled to the controller, the memory containing a set of instructions thereon that when executed by the controller cause the controller to: monitor an ambient audio signal acquired by a citizen communication device associated with a citizen; detect, based on the ambient audio signal, an interaction of the citizen with a public safety agency; responsive to detecting the interaction of the citizen with the public safety agency, cause an alert to be transmitted to a device associated with the public safety agency, the alert comprising data related to the citizen interaction limitation.

A second aspect of the present invention provides a device for alerting about a citizen interaction limitation comprising a controller and a memory coupled to the controller, the memory containing a set of instructions thereon that when executed by the controller cause the controller to: receive an alert regarding an interaction of a citizen with a public safety agency comprising data related to the citizen interaction limitation; determine a location of the citizen; identify an in-field first responder associated with the location of the citizen; cause a notification to be provided to a communication device associated with the identified in-field first responder, the notification comprising the data related to the citizen interaction limitation or instructions associated with the citizen interaction limitation A third aspect of the present invention is a computer-implemented method for alerting about a citizen interaction limitation comprising: monitoring an ambient audio signal acquired by a citizen communication device associated with a citizen; detecting, based on the ambient audio signal, an interaction of the citizen with a public safety agency; responsive to detecting the interaction of the citizen with the public safety agency, causing an alert to be transmitted to a device associated with the public safety agency, the alert comprising data related to the citizen interaction limitation.

A fourth aspect of the present invention is a computer-implemented method for alerting about a citizen interaction limitation comprising: receiving an alert regarding an interaction of a citizen with a public safety agency comprising data related to the citizen interaction limitation; determining a location of the citizen; identifying an in-field first responder associated with the location of the citizen; causing a notification to be provided to a communication device associated with the identified in-field first responder, the notification comprising the data related to the citizen interaction limitation or instructions associated with the citizen interaction limitation.

Turning now to the drawings, wherein numerals designate like components, FIG. 1 illustrates an exemplary operational environment for the present invention, a public-safety communication system 100.

FIG. 1 shows one example of a networked configuration, in which embodiments may be implemented. Other configurations are possible. In the example shown, the system 100 includes a 911 call routing system 104 and a public safety answering point (PSAP) 120. It should be understood that the system 100 is provided as one example and, in some embodiments, the system 100 may include fewer or additional components. As would be understood by one skilled in the art, FIG. 1 is a simplified diagram. Networks may be more or less complex than the schematic elements depicted in FIG. 1.

The 911 call routing system 104 and PSAP 120 are communicatively coupled to one another via a communications network 108. The communications network 108 is a communications network including wireless connections, wired connections, or combinations of both. The communications network 108 may be implemented using a wide area network, for example, the Internet (including public and private IP networks), a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network and one or more local area networks, for example, a Bluetooth™ network or Wi-Fi network, and/or combinations or derivatives thereof.

The public-safety communication system 100 may have access to a cloud computing infrastructure 150. Cloud computing infrastructures are offered by the cloud providers to provide different services, for example, data storage, a communication application configured to process and/or conduct and/or manage a call between communication devices or a camera image analysis application configured to perform a face recognition procedure. Hereafter, the cloud computing infrastructure 150 will be interchangeably referred to as the cloud 150. System 100 may also include more cloud computing infrastructures.

The call routing system 104 is configured to receive emergency calls from citizens. For example, a citizen 114 encountering an incident at a citizen location 110 may place an emergency call (for example, by dialing 9-1-1) using a citizen communications device 118.

In some embodiments, the citizen communications device 118 is a portable communications device including hardware and software configured to communicate via the communications network 108 (for example, using cellular network 130 and/or the Internet). The citizen communications device 118 may be, for example, a smart telephone, a mobile two-way radio, a smart watch, a laptop computer, a tablet computer, or another similar device capable of operating as described herein.

The cellular network 130 may operate according to an industry standard cellular protocol, for example, GSM, LTE (including LTE-Advanced or LTE-Advanced Pro compliant with, for example, the 3GPP TS 36 specification series), or the 5G standard (including a network architecture compliant with, for example, the 3GPP TS 23 specification series and a new radio (NR) air interface compliant with the 3GPP TS 38 specification series), among other possibilities, and over which, among other things, an open mobile alliance (OMA) push to talk (PTT) over cellular (OMA-PoC), a voice over IP (VOIP), or a PTT over IP (PoIP) application may be implemented.

An emergency call placed via the cellular network 130 is routed to the 911 call routing system 104. In FIG. 1, the 911 call routing system 104 represents the hardware and telecommunications infrastructure of a 911 system. The 911 call routing system 104 may include aspects of an Enhanced 911 (E911) system, a Next Generation 911 (NG911) system, or both. The 911 call routing system 104 operates to receive emergency calls placed by, among others, subscribers of the cellular network 130 and route those calls to a public safety answering point (PSAP) (for example, the PSAP 120). The 911 call routing system 104 chooses a PSAP for an emergency call at least partially based on a caller's current location (for example, as determined using a geolocation system contained in the citizen communications device 118).

Embodiments described herein are not limited in their application to emergency calls placed via cellular networks and may apply to emergency calls placed using landlines (e.g., the public switched telephone network, IP phones, satellite phones, and the like) or through other means. In some embodiments, emergency calls may be placed automatically by, among other things, an Internet of Things (IoT) device.

The PSAP 120 includes a dispatch computer 124, a database 126, and a call-taking terminal 128. The dispatch computer 124, database 126, and call-taking terminal 128 are communicatively coupled using one or more wired and/or wireless networks (not shown). A call taker 122 interacts with the call-taking terminal 128 to answer communications, including emergency calls, received at the PSAP 120 and access and modify data stored in the database 126. The PSAP 120 performs computer aided dispatch (CAD) operations for law enforcement and other emergency services. CAD operations are known and will not be described in detail. In some embodiments, call taker 122 may be an automated artificial intelligence (AI) bot or tool that may leverage natural language processing (NLP), voice to text, and/or text to voice technologies, and the like.

Communications received at the PSAP 120 include voice communications, for example, emergency calls received via the cellular network 130 and the 911 call routing system 104. In some embodiments, the PSAP 120 sends and receives other types of voice communications, including, for example, two-way radio communications, using same or other communications networks (not shown) or notifications from other systems. Communications received at the PSAP 120 may also include data communications, including, for example, short message service (SMS) messages and multimedia message service (MMS) messages (collectively referred to herein as "text messages"), email messages, pages, instant messages, and the like.

The dispatch computer 124 includes, among other things, a processor (for example, a microprocessor or another suitable programmable device), a memory (i.e., a computer-readable storage medium), an input/output interface (not shown), and various other hardware and software components for performing computer aided dispatch, call control, and other operations at a PSAP.

The dispatch computer 124 is communicatively coupled to the call-taking terminal 128, which includes one or more input devices, output devices, or input and output devices including, for example, one or more displays, keyboards, keypads, mice, joysticks, touchscreens, speakers, microphones, and headsets. The dispatch computer 124 receives input from and provides output (including emergency calls) to the call taker 122 through the call-taking terminal 128. The dispatch computer 124 and the call-taking terminal 128 are capable of controlling call handling hardware and software (not shown) to originate and terminate voice calls (for example, emergency calls), text message communications, and other forms of electronic communication either alone, or by interfacing with network equipment (not shown) in the communications network 108 and other communications networks.

The dispatch computer 124 is communicatively coupled to, and writes data to and from, the database 126. As illustrated in FIG. 1, the database 126 may be a database housed on a suitable database server communicatively coupled to and accessible by the dispatch computer 124 and the call-taking terminal 128.

In alternative embodiments, the dispatch computer and/or the database 126 may be part of a cloud-based database computer system (for example part of the cloud 150) and accessible by other components of the system 100 over one or more wired and/or wireless networks. In some embodiments, all or part of the database 126 may be locally stored on the (perhaps on premise) dispatch computer 124.

For example, the dispatch computer 124 may use data stored in the database 126 to dispatch in field first responders and other personnel to respond to incidents. The data may be received from members of the public and first responders (for example, the citizen 114 and a first responder 142 equipped with a portable communications device 140), and other sources. In some embodiments the database 126 electronically stores incident data, responder data, cartographic data, and/or call data.

Incident data refers to incident records for public safety incidents. An incident record is a data structure within the database 126, which contains information regarding a public safety incident, stored in a particular sequence and format. In some embodiments, the database 126 stores the incident data in a CAD incident database. As used herein, the terms "incident" and "public safety incident" refer to situations requiring the attention of one or more public safety agencies to protect the public and keep the public safe. In one example, an incident is a historical crime or a crime in progress, such as a bank robbery. In other examples, an incident is the response to a call for service, for example, responding to a traffic accident, searching for a suspect, locating a missing person, responding to a fire, responding to a medical emergency, investigating a past incident, and the like. The incident data for a given incident may include an incident type (for example, a property crime such as theft, a fire, a medical emergency, a natural disaster, a traffic stop, and the like), an incident identifier (for example, a unique alphanumeric code that identifies the incident record within a computer-aided dispatch system), call identifiers identifying emergency and non-emergency calls received related to the incident, and the like.

Examples of responder data include responder identifiers (for example, name, rank, agency, assignment, and the like), an active incident assignment for a responder, a responder role (for example, identifying a supervisory role or an area of operation overall or within the incident), a responder location, and responder equipment data (for example, model, configuration, and responder assignment information for portable communications devices).

Call data includes data for calls, including emergency calls, and other communications received at the PSAP 120 or at the communications device 140 associated with the in-field first responders in lieu of the PSAP 120. Examples of call data include a call identifier (for example, a unique alphanumeric code that identifies the call record within a CAD system), an incident assignment associating the call with an incident, a location from which the call was placed, a caller identifier identifying a caller that placed the call, and the like.

The call taker 122 may be a dispatcher trained to handle incident communications. For example, within a next generation 911 system, the call taker 122 may be a public safety dispatcher trained to handle emergency communications. As noted above, these communications can include voice communications (for example, voice calls) and/or data communications (for example, text messages, email messages, pages, video, and the like). Based on the received communications, the call taker 122 may manually dispatch the appropriate services to handle incidents reported by individuals. Alternatively, or in addition, the dispatch computer 124 may be configured to automatically dispatch appropriate services. The dispatch computer 124 and the call-taking terminal 128 may also receive data input from the call taker (or dispatcher) 122, which is saved to the database 126. Generally, regardless of how or when an individual communicates with the PSAP 120 about an incident, information about the communication is stored in the database 126.

FIG. 1 shows camera 146 with an associated speaker that can be part of the public-safety system or a separate (perhaps privately owned) surveillance system. The camera 146 may collect audio and/or video data in real-time and store the data or transmit the data to other parts of the system, for example the cloud 150 and/or PSAP 120. The camera 146 may be configured to communicate with the citizen 114, for example by automatically detecting abnormal behavior and playing a warning through the associated speaker.

FIG. 1 shows also a police car 144 associated with first responder 142, that can be equipped with external speakers and/or sirens.

The public-safety communication system 100 may further include computing device 102 that is in communication with the communication network 108. Although depicted as a separate device, some or all of the computing device 102 functionality described herein can be also a part of the PSAP 120 (for example, the dispatch computer 124), the 911 call routing system 104, the communication network 108, the cloud 150, the citizen communication device 118 or may be placed at other locations. Regardless of location and/or configuration, the computing device 102 is generally configured to perform the process of alerting about human interaction limitation.

Figure 2:
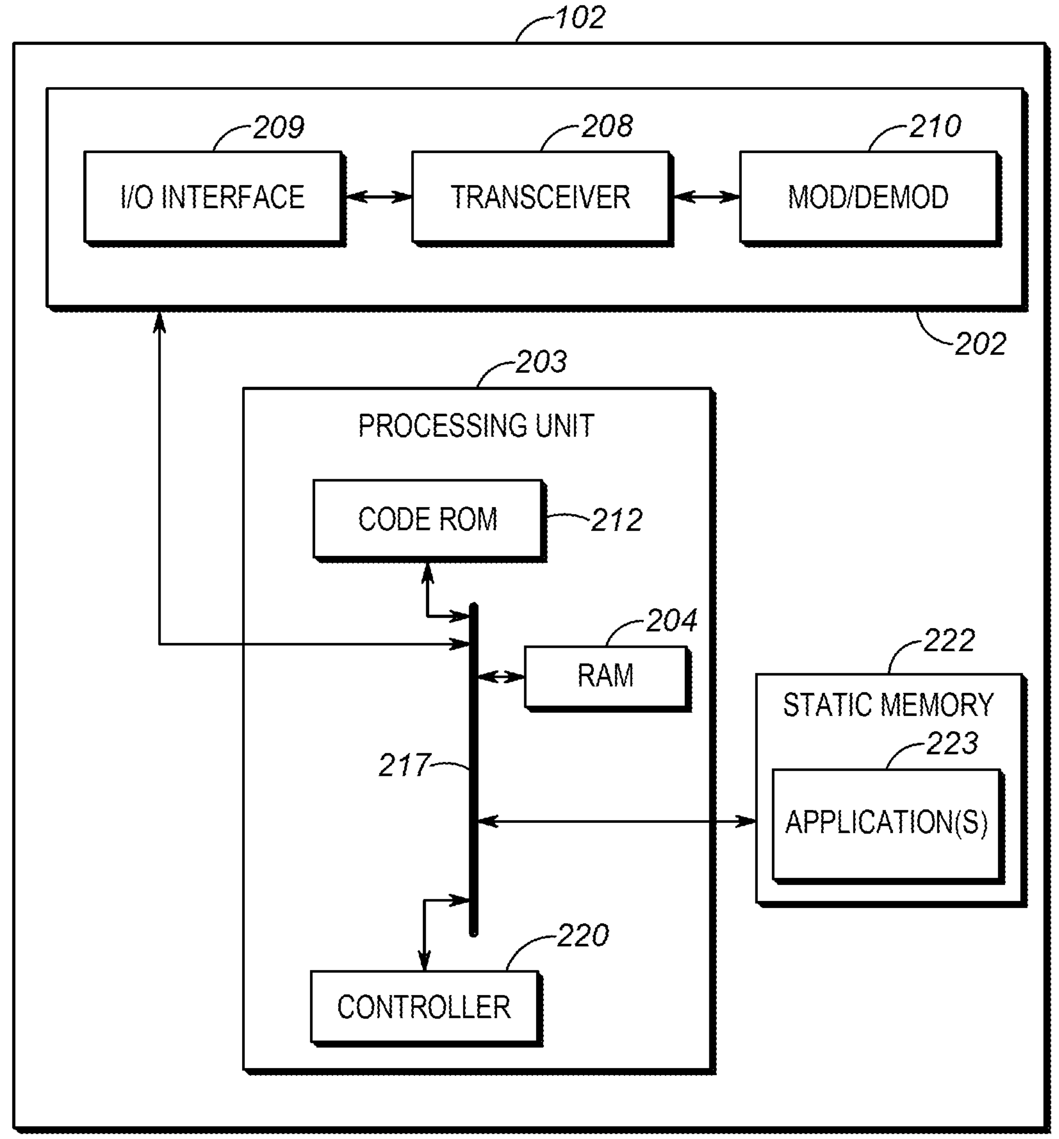
FIG. 2 is a device diagram showing a device structure of a computing device for alerting about human interaction limitation, in accordance with some embodiments.

FIG. 2 schematically illustrates one embodiment of the computing device 102.

As shown in FIG. 2, the computing device 102 includes the communication unit 202 communicatively coupled to the common data and address bus 217 of the processing unit 203. The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and the static memory 222.

The communication unit 202 may include one or more wired and/or wireless input/output (I/O) interfaces 209 which are configurable to communicate with at the communication network 108 and/or parts of the network (for example, the communications device 140 associated with the first responder 142). For example, the communication unit 202 may include one or more transceivers 208 and/or wireless transceivers for communicating with the communication network 108 and/or parts of the network. The one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or a similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 102 is not a generic controller and/or a generic device, but a device specifically configured to implement functionality for executing the cloud services in a cloud environment. For example, in some examples, the computing device 102 and/or the controller 220 specifically comprises a computer-executable engine configured to implement functionality for alerting about human interaction limitation.

The static memory 222 is a non-transitory machine-readable medium that stores machine-readable instructions to implement one or more programs or applications. Example machine-readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine-readable instructions) that implement some or all of the functional teachings of the computing device 102 as described herein are maintained, persistently, at the memory 222 and used by the controller 220, which makes appropriate utilization of volatile storage during the execution of such programming instructions.

Figure 3:
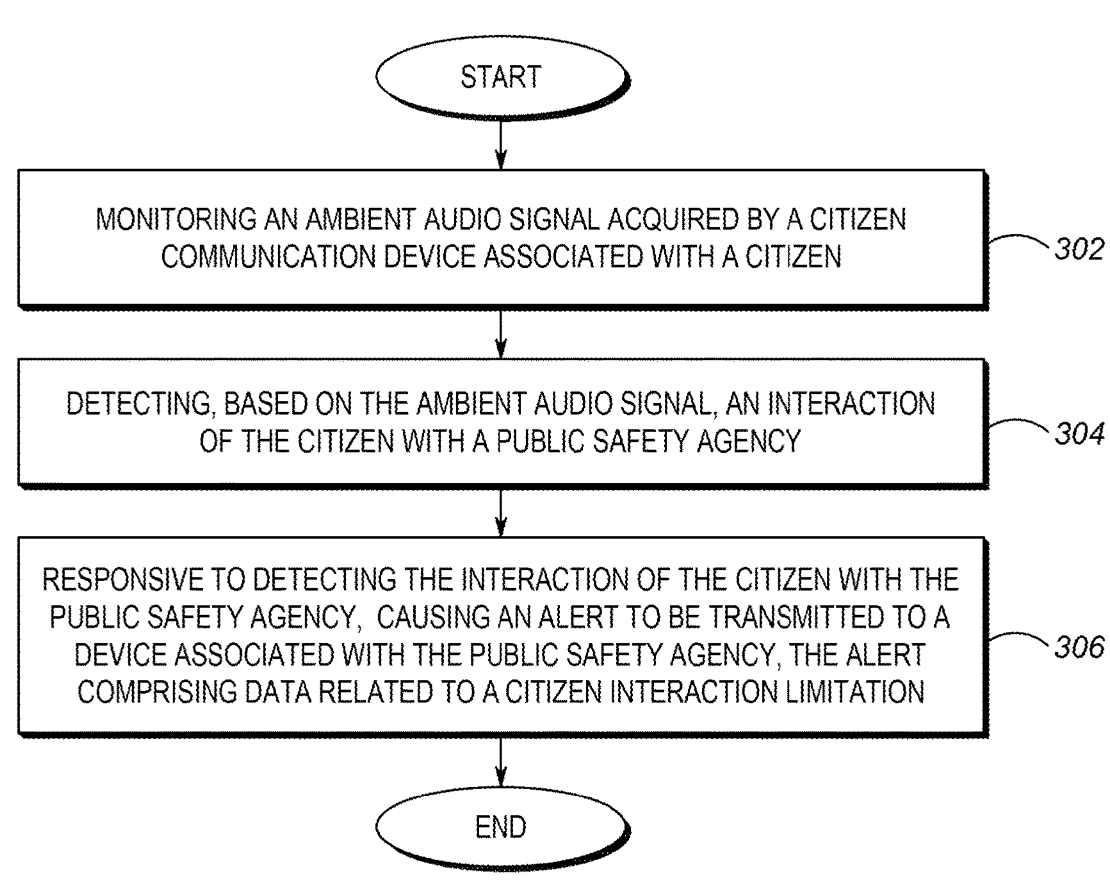
FIG. 3 is a flowchart of a process for alerting about human interaction limitation at a citizen device, in accordance with some embodiments.
Figure 4:
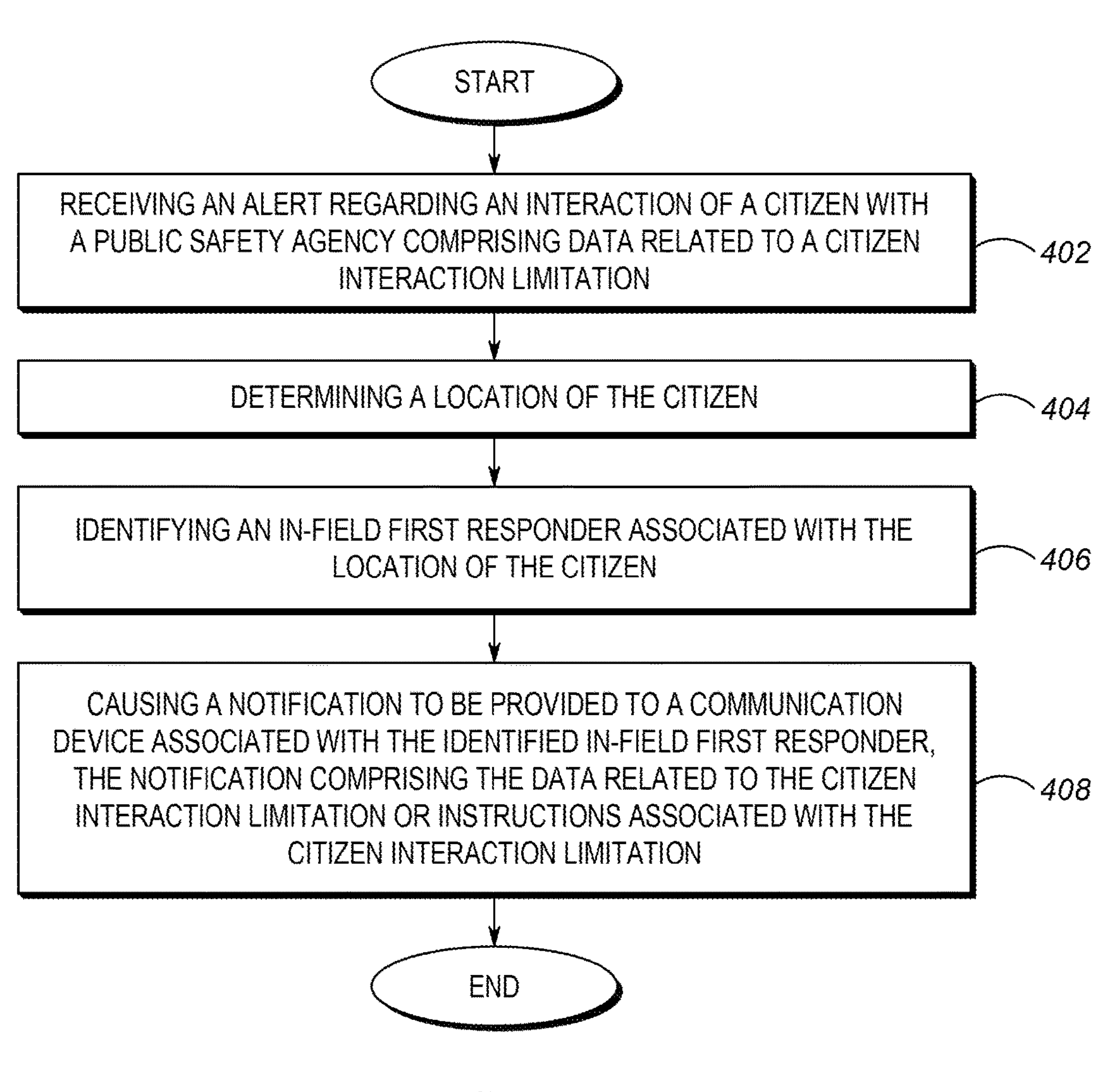
FIG. 4 is a flowchart of a process alerting about human interaction limitation at a computing device, in accordance with some embodiments.

In particular, the memory 222 stores instructions corresponding to the at least one application 223 that, when executed by the controller 220, enable the controller 220 to implement functionality of alerting about human interaction limitation including, but not limited to, one or more of the blocks of the process outlined in FIG. 3 and/or one or more of the blocks of the process outlined in FIG. 4.

In one illustrated example, when the controller 220 executes the application 223, the controller 220 is enabled to: monitor an ambient audio signal acquired by a citizen communication device associated with a citizen; detect, based on the ambient audio signal, an interaction of the citizen with a public safety agency; responsive to detecting the interaction of the citizen with the public safety agency, cause an alert to be transmitted to a device associated with the public safety agency, the alert comprising data related to a citizen interaction limitation.

Alternatively or additionally, when the controller 220 executes the application 223, the controller 220 is enabled to: receive an alert regarding an interaction of a citizen with a public safety agency comprising data related to a citizen interaction limitation; determine a location of the citizen; identify an in-field first responder associated with the location of the citizen; cause a notification to be provided to a communication device associated with the identified in-field first responder, the notification comprising the data related to a citizen interaction limitation or instructions associated with the citizen interaction limitation.

Moreover, an embodiment can be implemented as a non-transitory, computer-readable storage medium having program instructions stored thereon that when executed by the controller 220, enables the controller 220 to implement the functionality of alerting about human interaction limitation.

Attention is now directed to FIG. 3, which depicts a flowchart representative of a first process 300 of alerting about human interaction limitation. The operations of process 300 of FIG. 3 correspond to machine-readable instructions that are executed by the computing device 102, and specifically the controller 220 of the computing device 102. In the illustrated example, the instructions represented by the blocks of FIG. 3 are stored in the memory 222 for example, as the application 223. Process 300 of FIG. 3 is one way, among others, in which the controller 220 and/or the computing device 102 and/or the system 100 may be configured.

Process 300 of FIG. 3 need not be performed in the exact sequence as shown and likewise, various blocks may be performed in parallel rather than in sequence. Accordingly, the elements of process 400 are referred to herein as "blocks" rather than "steps." Process 300 of FIG. 3 may be implemented on variations of the system 100 of FIG. 1, as well.

At block 302, an ambient audio signal acquired by a citizen communication device 118 is monitored for an indication that an interaction of the citizen 114 with a public safety agency occurred.

The acquired ambient audio signal is analyzed to identify an interaction of the citizen with a public safety agency. In some embodiments, the process is implemented by the computing device 102 that is the citizen communications device 118 and monitoring and analysis is performed by the citizen communications device 118 that acquired the ambient audio signal. In other embodiments, the ambient audio signal acquired by the citizen communications device 118 is transmitted by the citizen communication device 118 to a second computing device 102 (that may or may not be in the cloud 150), where the acquired ambient audio signal is analyzed. It is also possible to perform analysis on both, the citizen communications device 118 and the second computing device 102. For example the citizen communications device 118 may be configured to detect the most common keywords, whereas the second computing device may execute one or more natural language processing (NLP) engines for receiving the acquired ambient audio signal, determine content and context of the acquired ambient audio signal and identify the intent of the interaction of the citizen 114 with the public safety agency based on the content and context of the acquired ambient audio signal, among other possibilities.

In some embodiments, wherein the process is implemented by the computing device 102 that is the citizen communications device 118, the process may also comprise a block (not shown) in which the ambient signal is acquired by the citizen communications device 118 associated with the citizen 114. In such implementations an operation mode of the citizen communications device 118 may be changed to capture the ambient audio. For example, the citizen communications device 118 may be in a mode with increased microphone sensitivity in order to receive the ambient audio signal more accurately. This mode can be switched on manually by the user or automatically (for example, upon detection that the device is in a public place).

At block 304 an interaction of the citizen with a public safety agency is detected, based on the ambient audio. The interaction of the citizen with a public safety agency may be detected by identifying, within the ambient audio, an audio potentially associated with a public safety personnel or an audio potentially associated with a public safety equipment. For example, the audio potentially associated with the public safety personnel may be identified by monitoring the acquired ambient audio for verbal commands, keywords and/or phrases often used by the first responders and the like (e.g. "Stop", "We need to speak with you", "Police", "Put your hands up!" etc.). The audio potentially associated with the public safety equipment may be identified by monitoring for a predefined sound (for example a siren sound, a police car signal sound, an ambulance signal sound), keywords and/or phrases (e.g. "Please, proceed to the nearest exit!", "Evacuation") and the like.

In some embodiments a probability of an occurrence of the interaction of the citizen with a public safety agency is determined and the interaction is detected when the probability exceeds a predefined threshold. For example, the keywords and phrases can have a weight assigned and the interaction is detected when the sum of weights of identified keywords and phrases exceeds the predefined threshold. In other examples, the interaction is detected only when predefined conditions are met. For example, the interaction is detected if predefined keywords and an alarm siren sound are identified within a predefined period of time, such as within 5, 10, 30, 60, or 120 s.

At block 306 an alert is transmitted to a device associated with the public safety agency in response to detecting the interaction of the citizen with the public safety agency, the alert comprising data related to a citizen interaction limitation. The device associated with the public safety agency may be the PSAP 120, the call-taking terminal 128, the 911 call routing system 104 or other device. In some embodiments, the device associated with the public safety agency is the same computing device 102 that detected the interaction. In such cases, transmitting the alert relates to initiating a predefined workflow that is configured to be triggered by detecting the interaction of the citizen with the public safety agency.

The alert may be a communication of any type that can be received by the device associated with the public safety agency. For example, the alert may be transmitted by a text message or by automatically placing an emergency call (for example, by dialing 9-1-1) and using prerecorded audio or AI bot. In other embodiments, the alert may be transmitted to the device associated with the public safety agency device indirectly. For example, the citizen communications device 118 may perform the analysis and, responsive to detecting the interaction of the citizen with the public safety agency, transmit data (for example, using a dedicated application) related to the detected interaction to the external device (for example, cloud 150). The external device may be configured to store the data related to a citizen interaction limitation and share this data with the device associated with the public safety agency in case of emergency, for example, when the emergency call was placed using the citizen communications device 118 and/or when the external device received the data related to the detected interaction of the citizen with the public safety agency. In some embodiments, if the device associated with the public safety agency is the same computing device 102 that detected the interaction, the alert may be an internal command that triggers the predefined workflow.

As mentioned above, the data related to a citizen interaction limitation may be stored by the external device configured to store and share this data with the device associated with the public safety agency. Alternatively or additionally the data related to a citizen interaction limitation may be stored in the database 126 or other location within PSAP 120 or the 911 call routing system 104. Regardless the location, an electronically stored mapping that maps citizen to the corresponding citizen interaction limitation data is provided. For example, the mapping may map an identifier of the citizen 114 and/or a phone number of the citizen communication device 118 to a list of conditions causing interaction limitation.

Alternatively or additionally the data related to a citizen interaction limitation may be stored by the citizen communication device 118.

The alert comprises the data related to the citizen interaction limitation. In some embodiments the electronically stored alert may comprise one or more of: the name of a condition that causes the citizen interaction limitation (for example "autism" or "hearing impairment"), the symptoms of the condition (for example "the person does not understand the commands", "the person does not like close contact") and/or the recommendation how to deal with the citizen (for example "speak slowly and clearly", "keep your distance"). The alert may further comprise one or more of: a citizen location 110, a part of the ambient audio signal acquired by the citizen communication device.

In some embodiments, the process may further comprise a block (not shown) in which responsive to detecting the interaction of the citizen with the public safety agency, a predefined electronically stored announcement related to the citizen interaction limitation is caused to be played through a speaker of the citizen communication device 118.

Attention is now directed to FIG. 4, which depicts a flowchart representative of a process 400 of alerting about human interaction limitation. The operations of process 400 of FIG. 4 correspond to machine-readable instructions that are executed by computing device 102, and specifically the controller 220 of the computing device 102. In the illustrated example, the instructions represented by the blocks of FIG. 4 are stored in the memory 222 for example, as the application 223. Process 400 of FIG. 4 is one way, among others, in which the controller 220 and/or the computing device 102 and/or the system 100 may be configured.

Process 400 of FIG. 4 need not be performed in the exact sequence as shown and likewise, various blocks may be performed in parallel rather than in sequence. Accordingly, the elements of process 400 are referred to herein as "blocks" rather than "steps." Process 400 of FIG. 4 may be implemented on variations of the system 100 of FIG. 1, as well.

At block 402, an alert regarding an interaction of a citizen with a public safety agency comprising data related to a citizen interaction limitation is received. The alert may be generated and initiated as described above in relation to the process 300. Therefore, the alert may be generated and transmitted to the computing device 102 implementing the process 400, responsive to detecting the interaction of the citizen with the public safety agency based on the ambient audio signal acquired by the citizen communication device 118.

At block 404 the location 110 of the citizen is determined. For example, data regarding the location of the citizen 110 may be included in the alert regarding the interaction of the citizen with the public safety agency. In other embodiments, the location of the citizen 110 may be received from the cellular network 130 (e.g., automatically by the network, or automatically or in response to a user request at the citizen communication device 108, among other possibilities), for example according to NENA Standards.

At block 406 an in-field first responder 142 associated with the location of the citizen is identified. In some embodiments, the identified first responder 142 is the responder that initiated the interaction of the citizen with the public safety agency (whose words or voice were identified as potentially associated with public safety personnel by analyzing the ambient audio signal acquired by the citizen communication device 118). In some embodiments, the identified first responder 142 is not a part of the interaction of the citizen with the public safety agency that trigger the alert, but is in a location associated with the location of the citizen 110 (for example, in the same building or within a predefined geofence from the location of the citizen 110, such as within 50, 100, 500, or 1,000 meters). The in-field first responder 142 associated with the location of the citizen may be identified by retrieving responder data from the database 126.

For example, the controller 220 may transmit a query to the database 126 requesting responder data that match the location of the citizen 110 based on the responders locations stored in the database 126. The database 126 may return data of the responders within the boundaries of the predefined geofence around the location of the citizen 110. The requested data may include the responder assignment information for portable communications devices to identify the communication device 140 associated with the identified in-field first responder 142.

In some embodiments, when multiple matches are determined, the computing device 102 assigns priorities to the matches. In one example, the matches may be ranked by distance between the location of the citizen 110 and the responders locations. In another example, other factors may be used additionally or alternatively to rank the matches. For example matches may be ranked based on which in-field first responder can most quickly arrive at the location of the citizen 110. Priorities may be assigned to matches based on other types of responder data (for example, an in-field responder who has undergone training regarding human interaction limitations may be prioritized).

At block 408, a notification is caused to be provided to a communication device 140 associated with the identified in-field first responder 142, the notification comprising the data related to the citizen interaction limitation or instructions associated with the citizen interaction limitation. The notification may be for example a voice call from the dispatcher 122 or an automatically generated text message.

The notification may comprise one or more of: the name of a condition that causes the citizen interaction limitation (for example "autism" or "hearing impairment"), the symptoms of the condition (for example "the person does not understand the commands", "the person does not like close contact") and/or the recommendation how to deal with the citizen (for example "speak slowly and clearly", "keep your distance"). In some embodiments, the notification comprises also the data relating to one or more of: the interaction of the citizen with the public safety agency, the citizen location, the instructions for the in-field responder 142 (for example "A citizen device acquired an audio relating to an emergency evacuation, the citizen has hearing impairment and may not understand the commands provided by the speakers, please go to floor 5 and find him).

In some embodiments, the notification is provided to the communication device 140 associated with the identified in-field first responder 142 in response to receiving a confirmation from a dispatcher or confirming the interaction of the citizen with the public safety agency by an analytics, to prevent false alarms (for example, when the keywords detected in the ambient audio signal originated from a movie). The interaction of the citizen with the public safety agency may be confirmed by an analytics using sensors (for example cameras) and/or by analyzing data retrieved from the database 126 (for example a police intervention was detected, but there are no in-field responders dispatched within a certain geofence from the citizen location 110, the citizen location 110 is a cinema or theater).

For example, a citizen interaction limitation alert is presented in a popup window on a display of the call-taking terminal 128. The citizen interaction limitation alert may comprise one or more of: data related to the alert regarding the interaction of the citizen with the public safety agency received at block 402, data related to the citizen interaction limitation, location of the citizen 110 determined at block 404, data regarding the in-field first responder 142 associated with the location of the citizen 110 identified at block 406, a list of the in-field first responders associated with the location of the citizen 110 identified at block 406 and ranked as described above, data related to the notification to be provided to the communication device 140 associated with the identified in-field first responder 142, or other data associated with the citizen 110 or the location of the citizen 110 or the in-field responder 142 or the citizen interaction limitation (for example, sensor data from the sensors within the predefined geofence from the location of the citizen). The call taker (or dispatcher) 122 has an option of confirming or rejecting the notification. The call taker (or dispatcher) 122 may have an option to choose the identified in-field responder form the ranked list of the in-field first responders associated with the location of the citizen 110. In some embodiments, the call taker (or dispatcher) 122 may choose how the notification will be provided to the communication device 140 associated with the identified in-field first responder 142 (for example, by choosing option "voice call" or "text message" from a menu presented on the display of the call-taking terminal 128.

In some embodiments, the notification is provided to the communication device 140 associated with the identified in-field first responder 142 in response to determining that the notification is not excluded by at least one of an exclusion criteria. The exclusion criteria are predefined conditions, that when met, prevent the notification from being directed to the identified in-field responder. The exclusion criteria may relate to one or more of: the location of the citizen, the identified in-field responder. For example, the notification is prevented if there is an incident of a certain type (for example active shooter) within a predefined geofence from the citizen location 110. In other examples, the notification is prevented if in-field first responder 142 takes part in a covert operation. The purpose of the exclusion criteria is to prevent the notification if it would make it more difficult for the responder to intervene, for example by distracting the responder or by de-conspiring the operation.

The process 300 of FIG. 3 and the process 400 of FIG. 4 may be performed by the same computing device 102 or by different devices. For example, the process 300 may be performed by the citizen communications device 118 or the cloud 150, whereas the process 400 may be performed by the PSAP 120 or the 911 call routing system 104. In some embodiments, the process 300 and the process 400 may form a one workflow performed by the system 100.

Although the system 100 is described as the public safety communication system, the invention may be also implemented in a private or a commercial system, for example a surveillance system of a university campus, hospital or any facility or institution.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture.

It is contemplated that any part of any aspect or embodiment discussed in this specification can be implemented or combined with any part of any other aspect or embodiment discussed in this specification.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

What is claimed is:

1. A device for alerting about a citizen interaction limitation comprising:

a controller; and a memory coupled to the controller, the memory containing a set of instructions thereon that when executed by the controller cause the controller to:

monitor an ambient audio signal acquired by a citizen communication device associated with a citizen, detect an interaction of the citizen with a public safety agency by identifying an audio issued by a public safety personnel or an audio generated by a public safety equipment in the ambient audio signal, responsive to detecting the interaction of the citizen with the public safety agency, cause an alert to be transmitted to a device associated with the public safety agency, the alert comprising data related to the citizen interaction limitation.

2. The device of claim 1, configured to detect the interaction of the citizen with a public safety agency by monitoring for one or more of: a verbal command, a keyword, a phrase or a sound.

3. The device of claim 1, wherein the alert further comprises one or more of: a citizen location, a part of the ambient audio signal acquired by the citizen communication device.

4. The device of claim 1, further configured to:

responsive to detecting the interaction of the citizen with the public safety agency, cause playing, through a speaker of the citizen communication device, a predefined announcement related to the citizen interaction limitation.

5. The device of claim 1, further configured to:

determine a location of the citizen, identify an in-field first responder associated with the location of the citizen, cause a notification to be provided to a communication device associated with the identified in-field first responder, the notification comprising the data related to the citizen interaction limitation or instructions associated with the citizen interaction limitation.

6. The device of claim 5, configured to cause the notification to be provided to the communication device associated with the identified in-field first responder in response to one or more of: receiving a confirmation from a dispatcher, confirming the interaction of the citizen with the public safety agency by analytics.

7. The device of claim 5, configure to cause the notification to be provided to the communication device associated with the identified in-field first responder in response to determining that providing the notification is not excluded by at least one of exclusion criteria.

8. The device of claim 7, wherein the exclusion criteria relate to one or more of: the location of the citizen, the identified in-field first responder.

9. A method for alerting about a citizen interaction limitation comprising:

monitoring an ambient audio signal acquired by a citizen communication device associated with a citizen, detecting an interaction of the citizen with a public safety agency by identifying an audio issued by a public safety personnel or an audio generated by a public safety equipment in the ambient audio signal, responsive to detecting the interaction of the citizen with the public safety agency, causing an alert to be transmitted to a device associated with the public safety agency, the alert comprising data related to the citizen interaction limitation.

10. The method of claim 9, wherein interaction of the citizen with a public safety agency is detected by monitoring for one or more of: a verbal command, a keyword, a phrase or a sound.

11. The method of claim 9, wherein the alert further comprises one or more of: a citizen location, a part of the ambient audio signal acquired by the citizen communication device.

12. The method of claim 9, further comprising:

responsive to detecting the interaction of the citizen with the public safety agency, causing playing, through a speaker of the citizen communication device, a predefined announcement related to the citizen interaction limitation.

13. The method of claim 9, further comprising:

determining a location of the citizen, identifying an in-field first responder associated with the location of the citizen, causing a notification to be provided to a communication device associated with the identified in-field first responder, the notification comprising the data related to the citizen interaction limitation or instructions associated with the citizen interaction limitation.

14. The method of claim 13, wherein the step of causing the notification to be provided to the communication device associated with the identified in-field first responder is performed in response to one or more of: receiving a confirmation from a dispatcher, confirming the interaction of the citizen with the public safety agency by analytics.

15. The method of claim 13, wherein the step of causing the notification to be provided to the communication device associated with the identified in-field first responder is performed in response to determining that providing the notification is not excluded by at least one of exclusion criteria.

16. The method of claim 15, wherein the exclusion criteria relate to one or more of: the location of the citizen, the identified in-field first responder.

* * * * *